United States Patent
Park et al.

(10) Patent No.: US 10,409,544 B2
(45) Date of Patent: Sep. 10, 2019

(54) DISPLAY DEVICE AND MULTI DISPLAY DEVICE

(71) Applicant: LG ELECTRONICS INC., Seoul (KR)

(72) Inventors: Sangjoon Park, Seoul (KR); Heeyoung Lim, Seoul (KR); Byungchang Cha, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/908,990

(22) Filed: Mar. 1, 2018

(65) Prior Publication Data
US 2018/0373482 A1    Dec. 27, 2018

(30) Foreign Application Priority Data

Jun. 26, 2017   (KR) .................. 10-2017-0080517

(51) Int. Cl.
| | | |
|---|---|---|
| *G06F 3/14* | (2006.01) | |
| *G09F 9/302* | (2006.01) | |
| *G09F 19/22* | (2006.01) | |
| *H04N 5/57* | (2006.01) | |
| *G09F 13/22* | (2006.01) | |

(52) U.S. Cl.
CPC .......... *G06F 3/1446* (2013.01); *G09F 9/3026* (2013.01); *G09F 19/22* (2013.01); *G09F 13/22* (2013.01); *G09G 2300/026* (2013.01); *G09G 2320/0626* (2013.01); *H04N 5/57* (2013.01)

(58) Field of Classification Search
CPC ...... G06F 3/1446; G09F 13/22; G09F 9/3026; G09G 2300/026; G09G 2320/0626; G09G 3/3648; G09G 3/3406; H04N 5/57; G01J 1/32

See application file for complete search history.

(56) References Cited

U.S. PATENT DOCUMENTS

| | | | |
|---|---|---|---|
| 2006/0158415 A1* | 7/2006 | Izumi | G09G 3/3648 345/98 |
| 2006/0202630 A1 | 9/2006 | Yamada | |
| 2008/0258046 A1* | 10/2008 | Jang | G09G 3/3406 250/214 AL |
| 2011/0181565 A1* | 7/2011 | Asamura | G01J 1/32 345/207 |
| 2011/0254876 A1* | 10/2011 | Yokoyama | G06F 3/1446 345/690 |

(Continued)

FOREIGN PATENT DOCUMENTS

| | | |
|---|---|---|
| JP | 2005-241806 A | 9/2005 |
| JP | 2005241806 A * | 9/2005 |

(Continued)

*Primary Examiner* — Richard J Hong
(74) *Attorney, Agent, or Firm* — Birch, Stewart, Kolasch & Birch, LLP

(57) ABSTRACT

A display device including a plurality of display units; a plurality of unit temperature sensors respectively connected to the plurality of display units and configured to respectively sense temperatures of the plurality of display units; and a control unit configured to set one of the sensed temperatures of the plurality of display units as a device representative temperature, and adjust a brightness of each of the plurality of display units in accordance with the device representative temperature.

10 Claims, 16 Drawing Sheets

(56) References Cited

U.S. PATENT DOCUMENTS

2014/0043380 A1\* 2/2014 Ichioka .................... H04N 5/57
                                                        345/690
2017/0192732 A1\* 7/2017 Yang ..................... G06F 3/1446

FOREIGN PATENT DOCUMENTS

| JP | 2012-103328 A | | 5/2012 |
|----|---------------|---|--------|
| JP | 2013-225035 A | | 10/2013 |
| JP | 2013225035 A | \* | 10/2013 |
| KR | 10-2016-0066100 A | | 6/2016 |

\* cited by examiner

FIG. 7

| reference temperature (°C) | reference brightness (%) |
|---|---|
| $T_1$ | $BR_1$ |
| $T_2$ | $BR_2$ |
| $T_3$ | $BR_3$ |
| $T_4$ | $BR_4$ |
| $T_5$ | $BR_5$ |
| $T_6$ | $BR_6$ |
| $T_7$ | $BR_7$ |
| $T_8$ | $BR_8$ |
| $T_9$ | $BR_9$ |
| $T_{10}$ | $BR_{10}$ |
| $T_{11}$ | $BR_{11}$ |
| $T_{12}$ | $BR_{12}$ |
| $T_{13}$ | $BR_{13}$ |
| $T_{14}$ | $BR_{14}$ |
| $T_{15}$ | $BR_{15}$ |
| $T_{16}$ | $BR_{16}$ |
| $T_{17}$ | $BR_{17}$ |
| $T_{18}$ | $BR_{18}$ |
| $T_{19}$ | $BR_{19}$ |
| $T_{20}$ | $BR_{20}$ |

(a)

(b)

(c)

DISPLAY DEVICE AND MULTI DISPLAY DEVICE

This application claims the benefit of Korean Patent Application No. 10-2017-0080517 filed on Jun. 26, 2017, the entire contents of which are incorporated herein by reference for all purposes as if fully set forth herein.

BACKGROUND OF THE INVENTION

Field of the Invention

The present invention relates to a display device and a multi display device.

Discussion of the Related Art

Digital signage is a communication tool that can induce marketing, advertising, training effects and customer experience of companies. Digital signage is a type of a display device which provides not only broadcasting programs but also certain information, in public places such as airports, hotels, hospitals.

Digital signage can be implemented by installing display devices such as LCD (Liquid Crystal Display), PDP (Plasma Display Panel), and OLED (Organic Light Emitting Diode) on a device such as a certain outdoor place or street furniture. Digital signage can display a variety of contents and commercials and can be installed at apartment elevators, subway stations, subways, buses, universities, banks, convenience stores, discount stores, shopping malls and the like.

Since digital signage is often installed outdoors, unlike in a room, it can be affected by temperature, ultraviolet rays, and the like. Digital signage also often needs to be very bright in order to show a clear picture as of considering the conditions of the external environment. The temperature inside the digital signage can also be raised due to the high luminance as well as the external environment.

When the temperature of the digital signage rises, the digital signage may experience a blackening phenomenon in which the screen of the digital signage looks burned, or the lifetime of the light emitting device (for example, the LED package) is shortened so that the screen can not be realized. Also, when a single screen is formed using a plurality of panels, the highest temperature may be different for each system, and a luminance difference between the panels may occur.

SUMMARY OF THE INVENTION

Accordingly, one object of the present invention is to solve the above problems or other problems.

Another object of this invention is to provide a display device of which a manufacturing process for assemble a back cover and a module cover is simplified.

Another object of the present invention is to provide a display device and a multi display device which can lower the overall temperature of the display panel by lowering the luminance of the display unit.

Another object of the present invention is to provide a display device and a multi display device which can prevent a difference in brightness of a plurality of display units.

According to an aspect of present invention, there is provided a display device including a plurality of display units; a plurality of unit temperature sensors connected to the plurality of display units respectively, the plurality of unit temperature sensors sensing temperatures of the plurality of display units respectively; and a control unit configured to: set one of temperatures of the plurality of display units as a device representative temperature; and adjust a rightness of each of the plurality of display units in accordance with the device representative temperature.

According to another aspect of present invention, there is provided a multi display device including a first display device including: a first group of display units; a first group of unit temperature sensors connected to the first group of display units respectively, the first group of unit temperature sensors sensing temperatures of the first group of display units; and a first control unit configured to: extract a first representative temperature from the temperatures of the first group of display units; and adjust a brightness of each of the first group of display units in accordance with the first representative temperature; and a second display device including: a second group of display units; a second group of unit temperature sensors connected to the second group of display units respectively, the second group of unit temperature sensors sensing temperatures of the second group of display units; and a second control unit configured to: extract a second representative temperature from the temperatures of the second group of display units; and adjust a brightness of each of the second group of display units in accordance with the second representative temperature, wherein the first control unit is connected to the second control unit. Further scope of applicability of the present invention will become apparent from the detailed description given hereinafter. However, the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings:

FIGS. 1 to 12 are views showing a configuration of a display device according to an embodiment of the present invention.

FIGS. 10 to 16 are views showing a configuration of a multi display device according to an embodiment of the present invention.

DETAILED DESCRIPTION OF THE EMBODIMENTS

Figure 1:
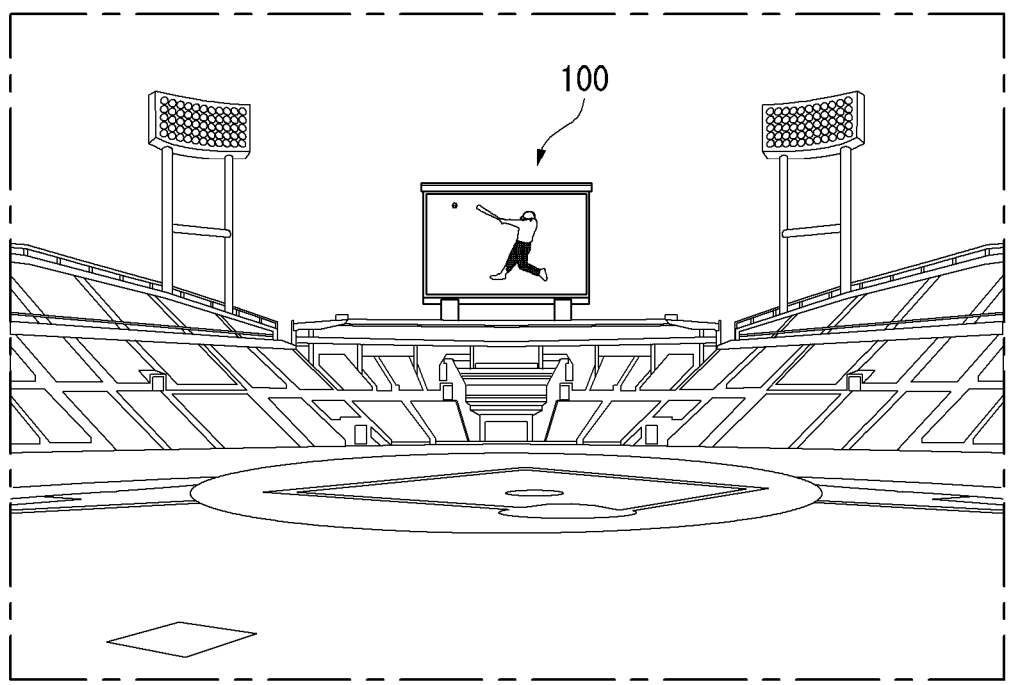

Reference will now be made in detail embodiments of the invention examples of which are illustrated in the accompanying drawings. Since the present invention may be modified in various ways and may have various forms, specific embodiments are illustrated in the drawings and are described in detail in the present specification. However, it should be understood that the present invention are not limited to specific disclosed embodiments, but include all modifications, equivalents and substitutes included within the spirit and technical scope of the present invention.

The terms 'first', 'second', etc. may be used to describe various components, but the components are not limited by such terms. The terms are used only for the purpose of distinguishing one component from other components. For example, a first component may be designated as a second component without departing from the scope of the present invention. In the same manner, the second component may be designated as the first component. The term "and/or" encompasses both combinations of the plurality of related items disclosed and any item from among the plurality of related items disclosed.

When an arbitrary component is described as "being connected to" or "being linked to" another component, this should be understood to mean that still another component(s) may exist between them, although the arbitrary component may be directly connected to, or linked to, the second component. In contrast, when an arbitrary component is described as "being directly connected to" or "being directly linked to" another component, this should be understood to mean that no component exists between them.

The terms used in the present application are used to describe only specific embodiments or examples, and are not intended to limit the present invention. A singular expression can include a plural expression as long as it does not have an apparently different meaning in context.

In the present application, the terms "include" and "have" should be understood to be intended to designate that illustrated features, numbers, steps, operations, components, parts or combinations thereof exist and not to preclude the existence of one or more different features, numbers, steps, operations, components, parts or combinations thereof, or the possibility of the addition thereof.

Unless otherwise specified, all of the terms which are used herein, including the technical or scientific terms, have the same meanings as those that are generally understood by a person having ordinary knowledge in the art to which the present invention pertains. The terms defined in a generally used dictionary must be understood to have meanings identical to those used in the context of a related art, and are not to be construed to have ideal or excessively formal meanings unless they are obviously specified in the present application.

The following exemplary embodiments of the present invention are provided to those skilled in the art in order to describe the present invention more completely. Accordingly, shapes and sizes of elements shown in the drawings may be exaggerated for clarity.

Hereinafter, the embodiments of the invention are described using a liquid crystal display panel as an example of a display panel. Other display panels may be used. For example, a plasma display panel (PDP), a field emission display (FED) panel, and an organic light emitting diode (OLED) display panel may be used.

Figure 2:
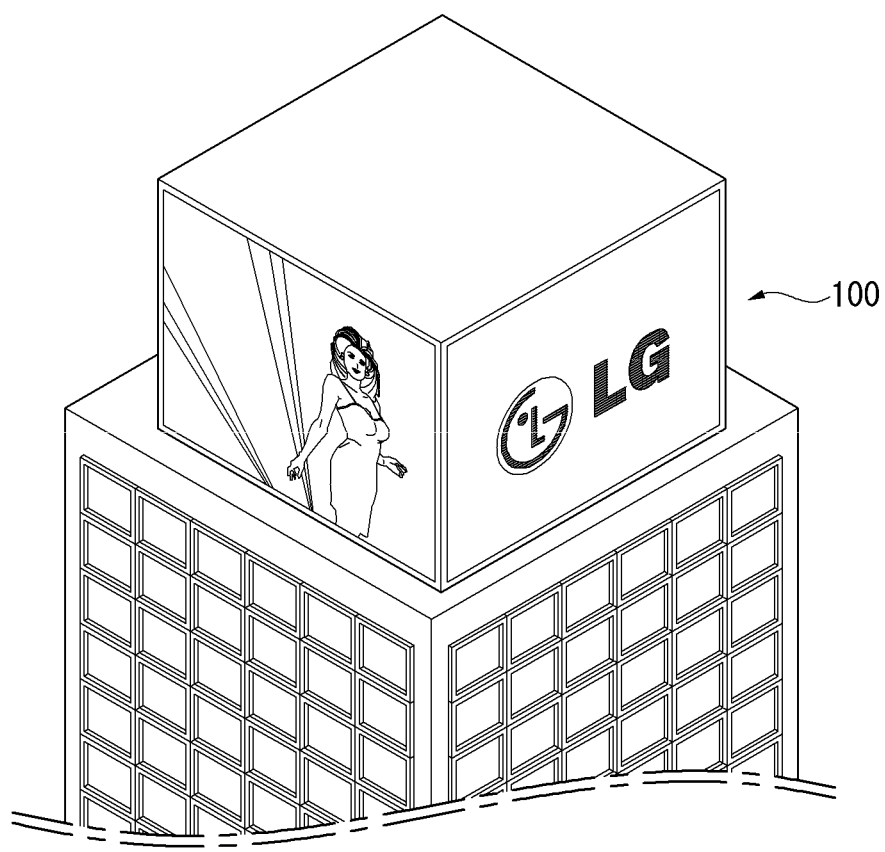

Referring to FIGS. 1 and 2, the display device 100 may be installed at an outdoor place, street furniture, or the like. The digital signage may be an example of the display device 100. For example, the digital signage may be installed on the electronic signboard in a stadium, or may be installed on the roof of a building.

The display device 100 installed in the stadium can display all the data related to the game in real time. A display device 100 installed on the roof of a building can display various contents, commercial advertisements and the like. The display device 100 may be installed inside a building, not outside. For example, the display device 100 may be installed on all public places such as apartment elevators, subway stations, subways, buses, universities, banks, convenience stores, discount stores, shopping malls, and the like.

Figure 3:
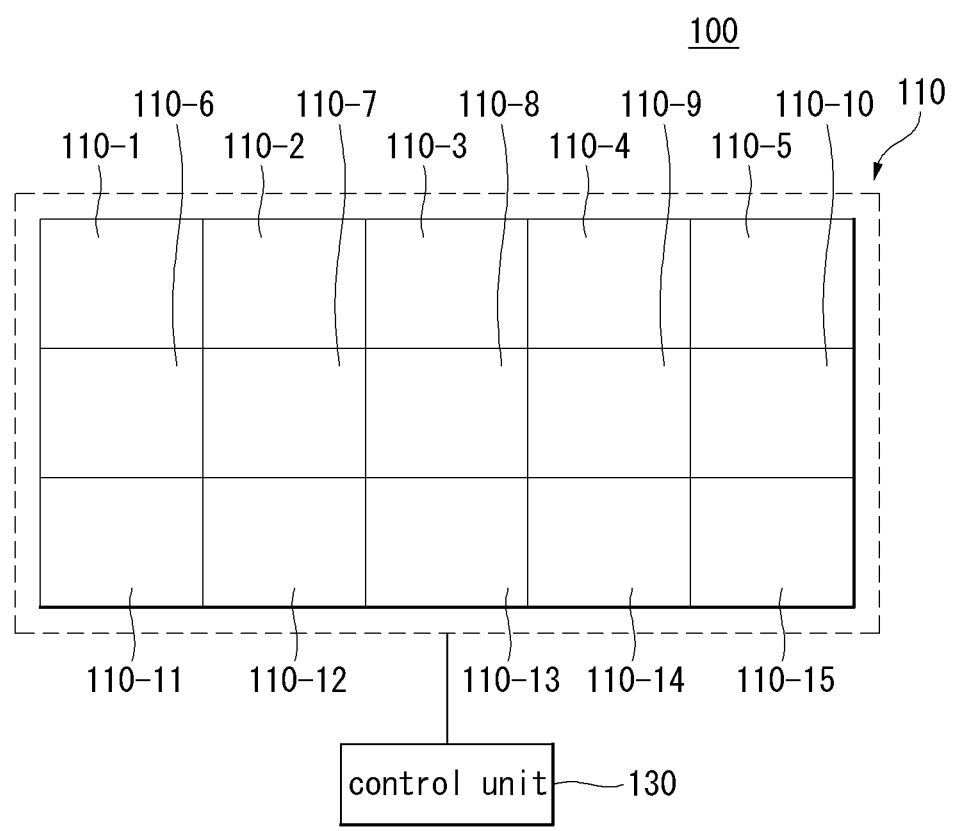

Referring to FIG. 3, the display device 100 may include a display unit 110. The display unit 110 may be provided in plurality. For example, the display unit 110 may include a first to a fifteenth display unit 110-1 to 110-15.

The plurality of display units 110 may be configured in a matrix form. For example, the first display unit 110-1 to the fifteenth display unit 110-15 may be configured in the form of three rows and five columns. In addition, the first to the fifth display unit 110-1 to 110-5 may constitute a row. The row constituted by the first to the fifth display unit 110-1 to 110-5 may be referred to as a first row. For example, the sixth to the tenth display unit 110-6 to 100-10 may constitute a row. The row constituted by the sixth to the tenth display unit 110-6 to 100-10 may be referred to as a second row. For example, the eleventh to the fifteenth display unit 110-11 to 100-15 may constitute a row. The row constituted by the eleventh to the fifteenth display unit 110-11 to 100-15 may be referred to as a third row. The second row may be located between the first row and the third row.

The display device 100 may include a control unit 130 for controlling the display unit 110. The plurality of display units 110 can also display different contents. However, the plurality of display units 110 can display the same contents. Each of the plurality of display units 110 can display assigned portion of the same contents.

In addition, the control unit 130 can obtain the temperature of the display unit 110. The control unit 130 can then adjust the brightness of the display unit 110 by comparing the temperature of the display unit 110 with the reference temperature.

Figure 4:
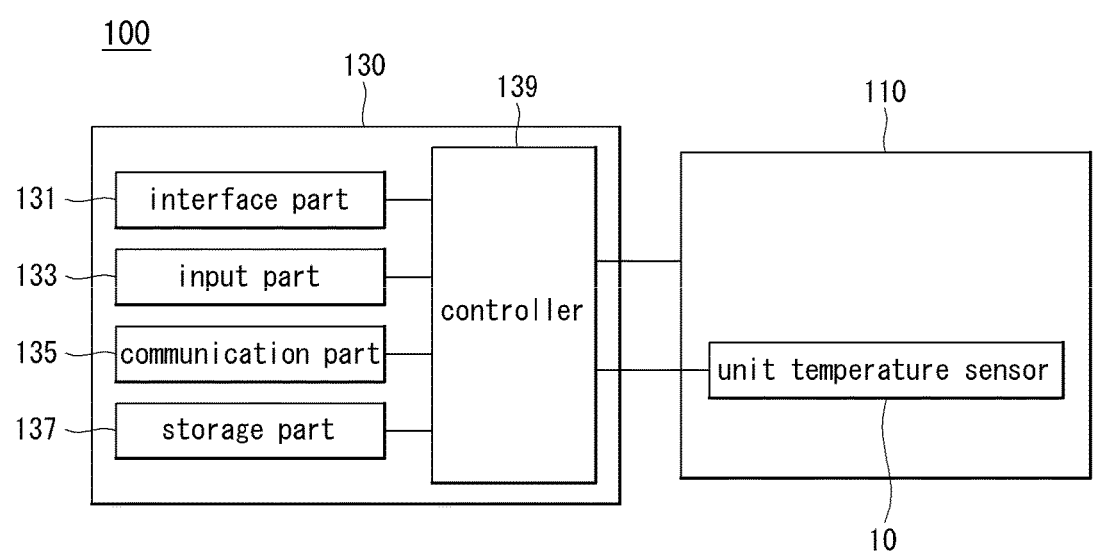

Referring to FIG. 4, the control unit 130 can be electrically connected to the display unit 110 and a unit temperature sensor 10. The unit temperature sensor 10 is electrically connected to the display unit 110 and can be mounted on the display unit 110. The unit temperature sensor 10 can measure the temperature of the display unit 110.

Further, the control unit 130 can be connected to the display unit 110 or the unit temperature sensors 10 directly or indirectly. For example, the control unit 130 can transmit or receive data to the display unit 110 or the unit temperature sensors 10, via I2C (Inter-Integrated Circuit) communication, wired or wireless communication.

As shown in FIG. 4, the control unit 130 can include an interface part 131, an input part 133, a communication part 135, a storage part 137, and a controller 139. The interface part 131 can display temperature information provided by a plurality of unit temperature sensors 10 disposed in the display unit 110 in real time. The interface part 131 may also include a touch screen functioning as an input part 133.

Further, the input part 133 can receive input data for controlling the operation of the display unit 110 from the outside. For example, the input part 133 may include a key pad, a dome switch, a touch pad, a jog wheel, a jog switch, and the like.

The communication part 135 can connect the display unit 110 and the unit temperature sensors 10 using a wired/wireless network. The communication part 135 can also connect the display unit 110 to other electronic devices using a wired/wireless network. For example, the communication part 135 may include a broadcast receiving module, a mobile communication module, a wireless Internet module, a short range communication module, and a location information module.

The wireless Internet module may include a module for wireless Internet access. For example, the wireless Internet may be a WLAN (Wireless LAN), a Wi-Fi (Wireless Fidelity), a Wibro (Wireless broadband), a Wimax (World Interoperability for Microwave Access), HSDPA (High Speed Downlink Packet Access), LTE (Long Term Evolution), and the like. The short range communication module may be a module for short range communication. For example, short range communication may include Bluetooth, RFID (Radio Frequency Identification), IrDA (infrared data association), UWB (Ultra Wideband), ZigBee, and the like.

Data may be stored in the storage part 137. For example, a temperature-brightness table (see FIG. 7) may be stored in the storage part 137. The storage part 137 corresponds to a memory in which data is stored. The data recorded in the storage part 137 can also be corrected or adjusted.

The controller 139 is electrically connected to and controls the interface part 131, the input part 133, the communication part 135, and the storage part 137. The controller 139 is also electrically connected to and controls the display unit 110.

Figure 5:
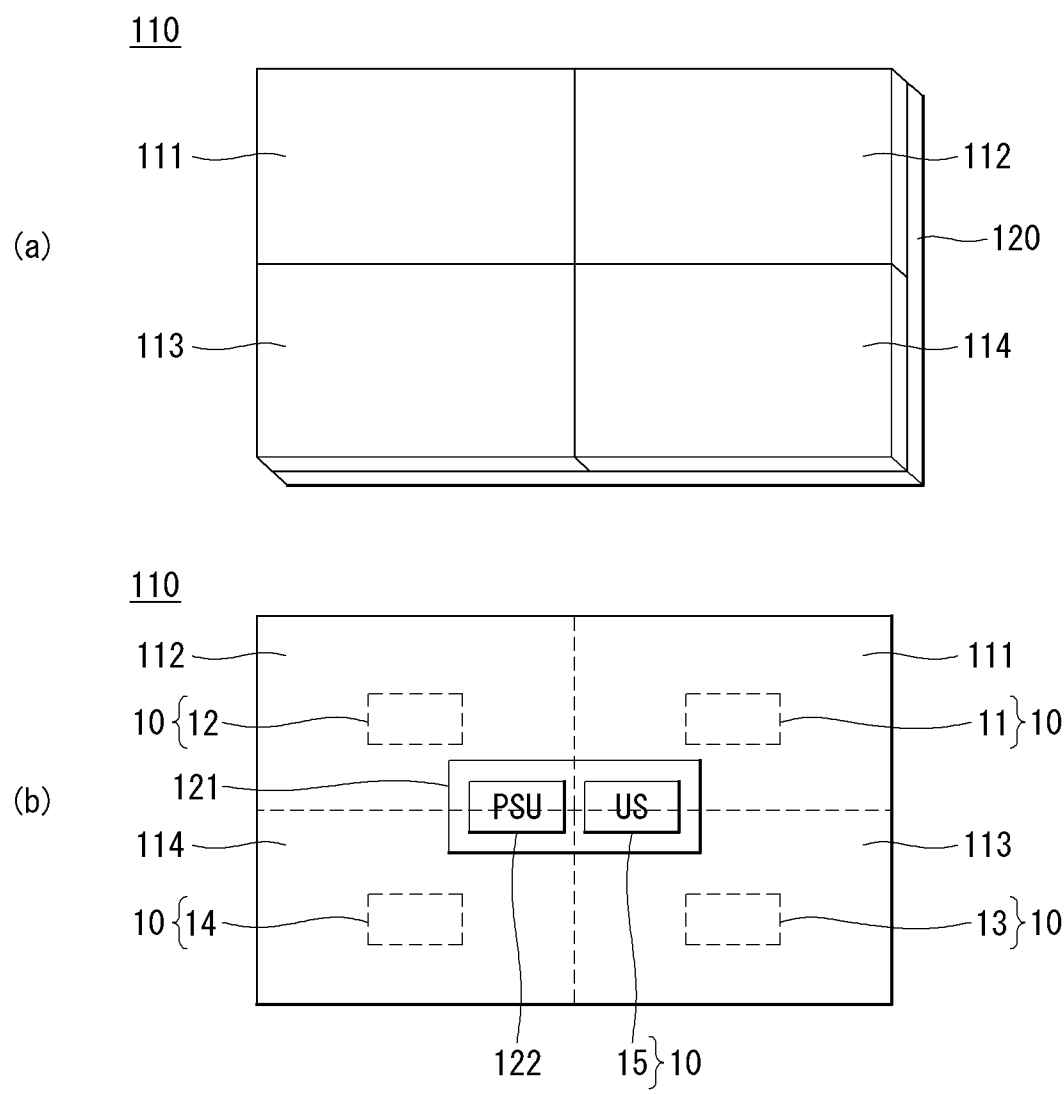

Referring to FIG. 5(a), the display unit 110 may include plural display modules 111 to 114 and a support plate 120. For example, the display unit 110 may include first to fourth display modules 111 to 114 displaying an image toward a forward of the display modules 111 to 114. The support plate 120 is also located behind the display modules 111 to 114 and is coupled to the display modules 111 to 114.

In addition, the display modules 111 to 114 can display an image and may include, for example, a panel constituted of LED elements as pixels. The display modules 111 to 114 may also include at least one among a liquid crystal display panel, a thin film transistor-liquid crystal display panel, an organic light-emitting diode panel, a flexible display panel, and a three-dimensional display panel.

Referring to FIG. 5(b), a panel driver 121 may be disposed behind the display modules 111 to 114 and be electrically connected to the control unit 130. The panel driver 121 can thus drive the display modules 111 to 114. For example, the panel driver 121 may include a FPGA (field programmable gate array), which is a semiconductor device including a programmable logic element and a programmable internal line.

Further, the panel driver 121 may include a power supply unit 122 and a unit temperature sensor 10. In more detail, the power supply unit 122 can be supplied with electric power from the outside and convert AC power to DC power. The power supply unit 122 also supplies the display modules 111 to 114 with electric power. For example, the power supply unit 122 may provide the display modules 111-114 with DC power.

In addition, the unit temperature sensor 10 may include a plurality of display module sensors 11 to 14. For example, the unit temperature sensor 10 may include a first display module sensor 11, a second display module sensor 12, a third display module sensor 13, and a fourth display module sensor.

The first display module sensor 11 can measure the temperature of the first display module 111, and the second display module sensor 12 can measure the temperature of the second display module 112. Further, the third display module sensor 13 can measure the temperature of the third display module 113, and the fourth display module sensor 14 can measure the temperature of the fourth display module 114.

Also, the unit temperature sensor 10 may include a board temperature sensor 15 disposed in the panel driver 121. The board temperature sensor 15 can measure the temperature of the panel driver 121 and/or the temperature of the power supply unit 122.

In addition, the unit temperature sensor 10 outputs at least one among the temperature information obtained from the first to the fourth display module sensors 11 to 14 and the temperature information obtained from the board temperature sensor 15 to the controller 139 (see FIG. 4). For example, the unit temperature sensor 10 can output both the temperature information obtained from the first to the fourth display module sensors 11 to 14 and the temperature information obtained from the board temperature sensor 15 to the controller 139 (see FIG. 4). The unit temperature sensor 10 can also provide the controller 139 (see FIG. 4) with the temperature information.

In more detail, the temperature information may be corresponding to the highest temperature among: the temperature information obtained from the first to fourth display module sensors 11 to 14 and the temperature information obtained from the board temperature sensor 15. The temperature information corresponds to information regarding a temperature of at least one of the display modules 111 to 114 and the panel driver 121.

Figure 6:
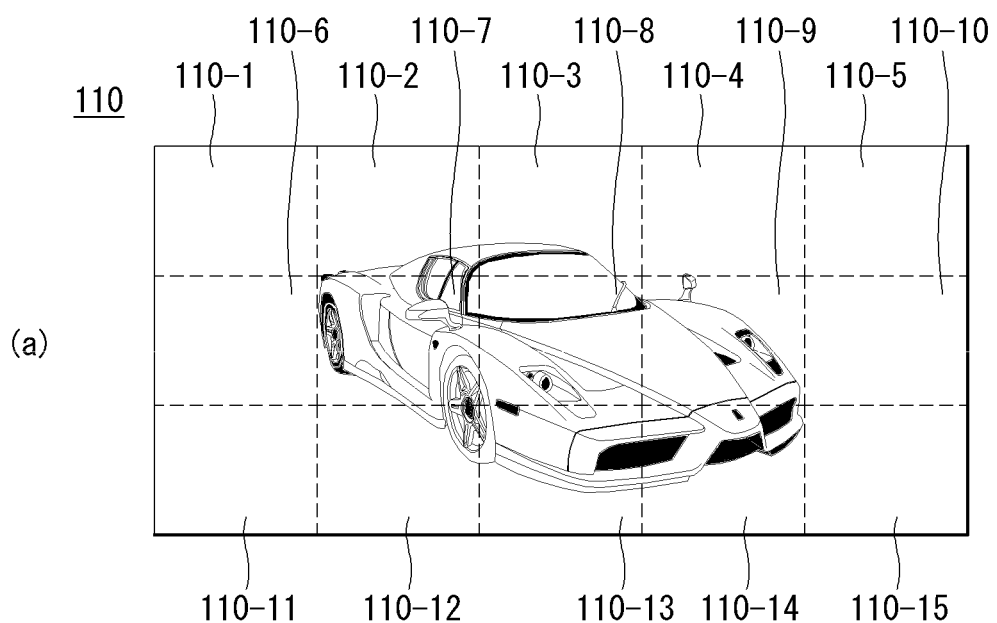

Referring to FIG. 6(a), the display unit 110 may include a plurality of display units 110-1 to 110-15 displaying an image. The temperatures of the plurality of display units 110-1 to 110-15 may be different from each other.

Referring to FIG. 6(b), the interface unit 131 can display the temperatures of the plurality of display units 110-1 to 110-15. For example, the temperature of the first display unit 110-1 may be 45° C., the temperature of the second display unit 110-2 may be 48° C., the unit temperature of the third display unit 110-3 may be 49° C., and the unit temperature of the fourth display unit 110-4 may be 49° C.

The control unit 130 can set the highest temperature among the temperatures of the plurality of display units 110-1 to 110-15 as the 'device representative temperature.' For example, the device representative temperature may be the temperature of the third display unit 110-3 or the temperature of the fourth display unit 110-4, which is 49° C.

Referring to FIG. 7, the temperature-brightness table may include information on reference temperatures $T_1$ to $T_{20}$ and reference brightness $BR_1$ to $BR_{20}$. The reference brightness $BR_1$ to $BR_{20}$ may be plural. For example, the reference brightness $BR_1$ to $BR_{20}$ may include a first reference brightness $BR_1$ to a twentieth reference brightness $BR_{20}$. The reference temperatures $T_1$ to $T_{20}$ may also be plural. For example, the reference temperatures $T_1$ to $T_{20}$ may include a first reference temperature $T_1$ to a twentieth reference temperature $T_{20}$.

In addition, the reference brightness may be referred to as a reference luminance. 'the first reference' and 'the second reference' may stand for neighboring value sequentially in terms of temperature or brightness. For example, the second reference temperature may refer to the next reference value of the first reference temperature. In the context of neighboring value, the first reference temperature may refer to one of the plurality of reference temperatures $T_1$ to $T_{19}$. For example, the second reference brightness may refer to the next reference value of the first reference brightness. In the context of neighboring value, the first reference brightness may refer to one of the plurality of reference brightnesses $BR_1$ to $BR_{19}$.

Each of the reference brightness $BR_1$ to $BR_{20}$ may correspond to each of the reference temperature $T_1$ to $T_{20}$ respectively. For example, the first reference brightness $BR_1$ may correspond to the first reference temperature $T_1$, and the ninth reference brightness $BR_9$ may correspond to the ninth reference temperature $T_9$. The reference brightness means one of the reference brightness $BR_1$ to $BR_{20}$, and the reference temperature means a temperature corresponding to the reference brightness.

When the display unit 110 (see FIG. 6) displays an image with a high brightness (luminance) at a relatively high temperature, the display unit 110 (see FIG. 6) may be damaged due to the generated heat. Therefore, the allowable luminance or brightness can be set according to the reference temperature. The reference brightness means the brightness allowed for the display unit 110 (see FIG. 6) at the reference temperature.

The first reference temperature $T_1$ to the twentieth reference temperature $T_{20}$ may also be sequentially increased. For example, the tenth reference temperature $T_{10}$ may be greater than the ninth reference temperature $T_9$, the first reference temperature $T_1$ may be the smallest among the reference temperatures $T_1$ to $T_{20}$, and the twentieth reference temperature $T_{20}$ may be the greatest among the reference temperatures $T_1$ to $T_{20}$.

Figure 8:
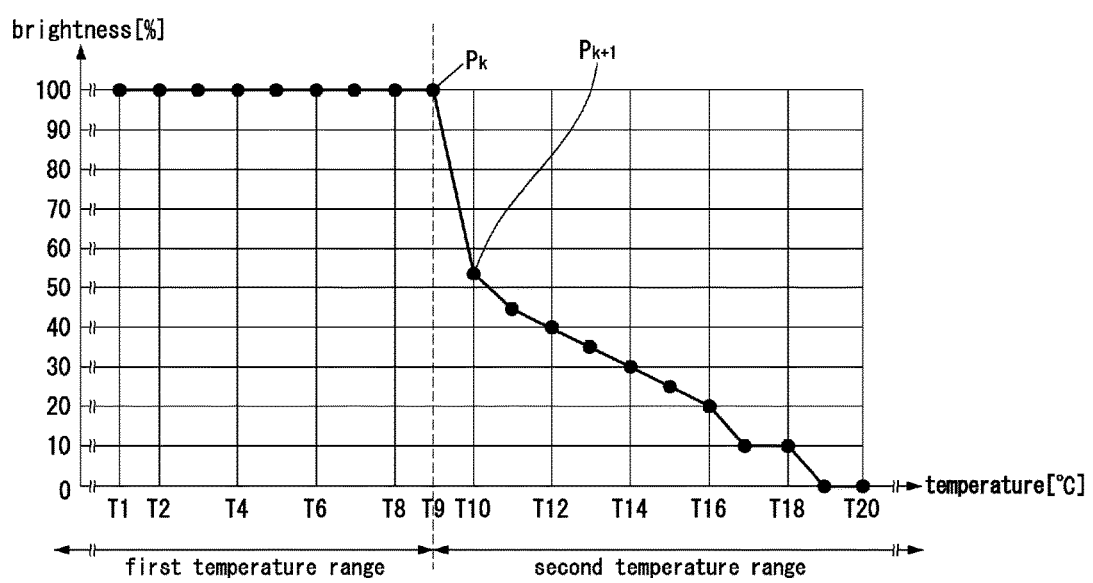

Next, FIG. 8 is a graph showing the table shown in FIG. 7. The unit of the reference brightness is a percentage (%), and the unit of the reference temperature is Celsius. In FIG. 8, the first reference brightness ($BR_1$, see FIG. 7) to the twentieth reference brightness ($BR_{20}$, see FIG. 7) can be expressed by using specific numerical values.

For example, the temperature difference between the nth reference temperature $T_n$ and the 'n+1' th reference temperature $T_{n+1}$1 may be one of 5° C., 10° C., or 15° C. Here n is a natural number. For example, if the first reference temperature $T_1$ is 5° C., the second reference temperature $T_2$ may be 10° C. The '0' of the graph may stand for a zero percent of brightness, and the '0' of the graph may not stand for a zero ° C. For example, the first temperature $T_1$ may be under 0° C.

The temperature can be divided into a first temperature range and a second temperature range. The first temperature range and the second temperature range may be classified based on, for example, the ninth reference temperature $T_9$. For example, the temperature belonging to the first temperature range means a temperature not higher than the ninth reference temperature $T_9$. In addition, the temperature belonging to the second temperature range means a temperature not lower than the ninth reference temperature $T_9$.

The graph shown in FIG. 8 can be explained together with FIG. 4. The unit temperature sensor 10 can measure the temperature of the display unit 110, and the controller 139 can obtain the temperature information of the display unit 110 from the unit temperature sensor 10.

Further, the controller 139 can determine whether the temperature of the display unit 110 belongs to the first temperature range. When the temperature of the display unit 110 belongs to the first temperature range, the display unit 110 may have relatively low probability of overheating.

The controller 139 can determine whether the temperature of the display unit 110 belongs to the second temperature range. In general, the brightness of the display unit 110 has a positive correlation with the heat generation of the display unit 110. When the temperature of the display unit 110 belongs to the second temperature interval, the display unit 110 may have relatively high probability of overheating. The controller 139 can thus adjust the brightness of the display unit 110, when the temperature of the display unit 110 belongs to the second temperature range.

For example, the controller 139 can set the target brightness corresponding to the temperature of the display unit 110, when the temperature of the display unit 110 belongs to the second temperature range. The controller 139 can also extract the target brightness from the temperature-brightness table. For example, the controller 139 can extract the target brightness from the temperature-brightness table using interpolation. The controller 139 can then adjust the brightness of the display unit 110 to be equal to or lower than the target brightness.

Figure 9:
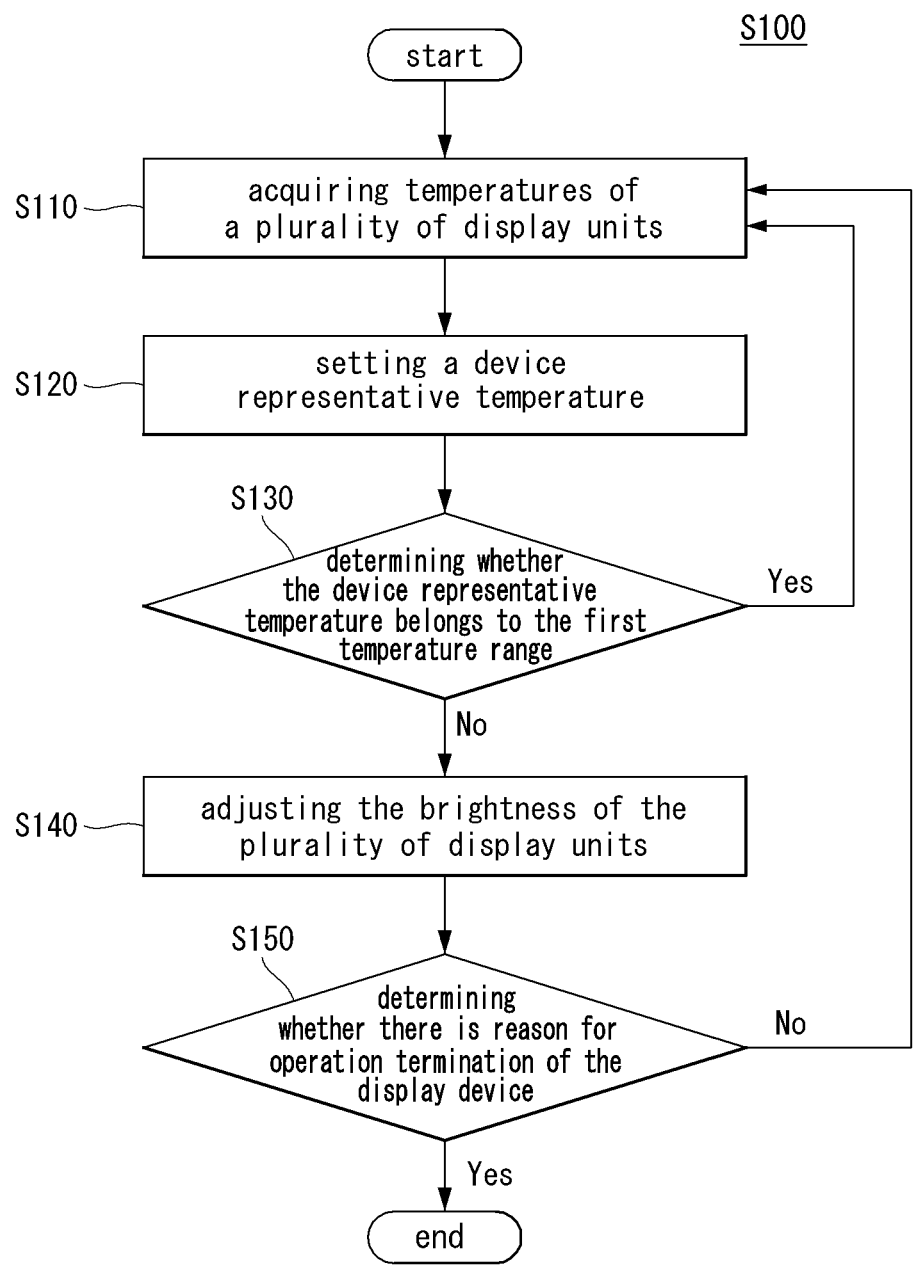
Figure 10:
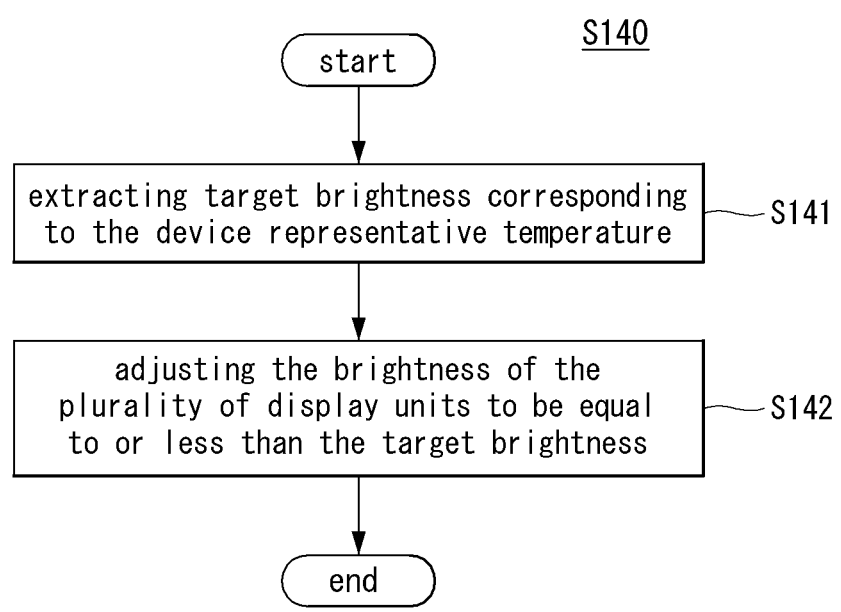
Figure 11:
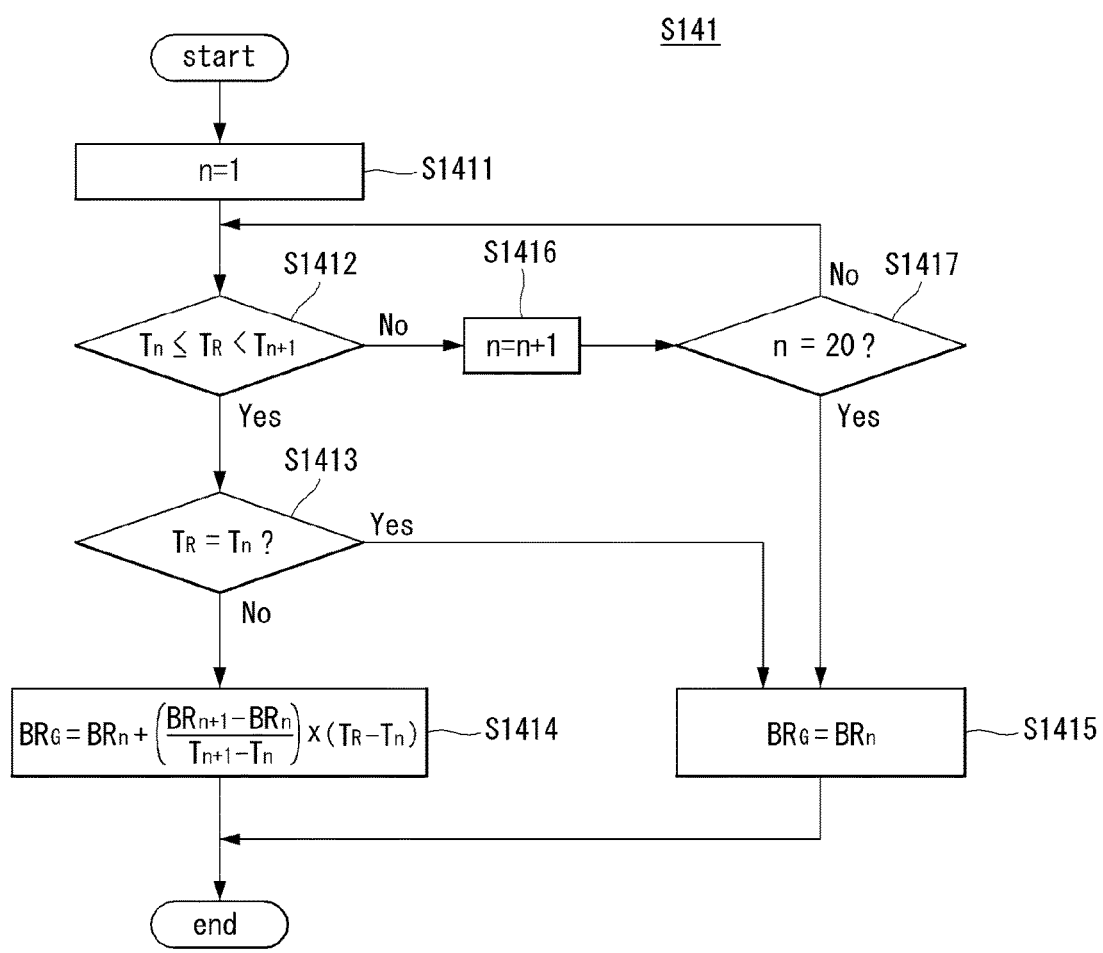

Next, FIGS. 9 to 11 may be explained with FIG. 4. Referring to FIG. 9, a method S100 for controlling a brightness of a display device includes a step S110 of acquiring temperatures of a plurality of display units 110. In this step S110, the unit temperature sensor 10 can measure the temperature of the plurality of display units 110. In this step S110, the controller 139 can receive the temperatures of the plurality of display units 110 from the unit temperature sensor 10.

The method S100 for controlling the brightness of the display device also includes a step S120 of setting a device representative temperature. In this step S120, the control unit 139 can compare the individual temperatures of the plurality of display units 110 and set the highest temperature to the device representative temperature. The device representative temperature can be referred to as $T_R$.

The method S100 for controlling the brightness of the display device includes a step S130 of determining whether the device representative temperature $T_R$ belongs to the first temperature range. The first temperature range may be referred to in FIG. 8. The first temperature range means a relatively low temperature range. For example, the first temperature range means a temperature range between a lower limit and an upper limit. The upper limit of the first temperature range may be 46° C. The lower limit of the first temperature range may stand for the lowest temperature at which the display device 100 can operate. The lower limit of the first temperature range may be under 0° C.

When the device representative temperature $T_R$ belongs to the first temperature range, it may be determined that the probability which the display unit 110 is overheated is relatively low. When the device representative temperature $T_R$ belongs to the first temperature range, the controller 139 can obtain the temperature of the plurality of display units 110 again.

The method S100 for controlling the brightness of the display device further includes a step S140 of adjusting the brightness of the plurality of display units 110. When the device representative temperature $T_R$ does not belong to the first temperature range, it may be determined that the temperatures of the plurality of display units 110 are relatively high. When the device representative temperature $T_R$ does not belong to the first temperature range, the controller 139 can adjust the brightness of the plurality of display units 110. For example, the controller 139 can lower the brightness of the plurality of display units 110 at the same time. If the brightnesses of the plurality of display units 110 are simultaneously lowered, the difference in brightness of the plurality of display units 110 can be suppressed.

The method S100 for controlling the brightness of the display device also includes a step S150 of determining whether there is the reason for operation termination of the display device 100. In this step S150, the controller 139 can determine whether there is any reason for operation termination of the display device 100. The controller 139 can terminate the operation of the display device 100 if there is the reason for termination of the operation of the display device 100. The controller 139 can acquire the temperatures of the plurality of the display units 110 if there is no reason for termination of the operation of the display device 100.

Referring to FIG. 10, the step S140 of adjusting the brightness of the plurality of display units 110 includes a step S141 of extracting target brightness corresponding to the device representative temperature $T_R$. The target brightness can be referred to as $BR_G$ as a symbol and correspond to the device representative temperature $T_R$. The target brightness $BR_G$ means an appropriate brightness which is acceptable to the display unit 110 when the temperature of the plurality of display units 110 is the device representative temperature $T_R$. In this step S141, the controller 139 can extract the target brightness $BR_G$.

The step S140 of adjusting the brightness of the plurality of display units 110 includes a step S142 of adjusting the brightness of the plurality of display units 110 to be equal to or less than the target brightness $BR_G$. In this step S142, the controller 139 can adjust the brightness of the plurality of display units 110 to be equal to or less than the target brightness $BR_G$. For example, the controller 139 can control the brightness of the plurality of display units 110 by controlling the panel driver 121 (see FIG. 5) connected to the display unit 110 or the power supply unit 122 (see FIG. 5).

In this step S142, the controller 139 can gradually decrease the brightness of the display unit 110 along time. For example, when the brightness of the current display unit 110 is 100% and the target brightness $BR_G$ is 70%, the first temporary target brightness $BR_G$ of the display unit 110 may be 90% for the first time duration, the second temporary target brightness $BR_G$ of the display unit 110 may be 80% for the second time after the first time, and the third temporary target brightness BRG of the display unit 110 after the second time may be 70%. The total sum of the first time and the second time may be shorter than the period in which the target brightness $BR_G$ of the display unit 110 is set. Through such a process, abrupt change of the brightness of the display unit 110 can be prevented.

Referring to FIG. 11, the step S141 of extracting the target brightness corresponding to the device representative temperature includes a step S1411 of setting the value of the indicator to 1. The indicator can be represented by the symbol n, and the indicator n may be a natural number. The indicator n can be increased. For example, the indicator n can be increased from 1 to 2. In addition, the indicator n can be increased from 2 to 3. In this step S1411, the controller 139 can set the indicator n to 1.

Step S141 of extracting the target brightness corresponding to the device representative temperature includes a step S1412 of comparing the device representative temperature $T_R$ with the reference temperature $T_n$ and the reference temperature $T_{n+1}$. The reference temperature $T_n$ means the n-th reference temperature $T_n$ shown in FIG. 7 or 8, and the reference temperature $T_{n+1}$ means the (n+1) reference temperature $T_{n-1}$ shown in FIG. 7 or 8. In this step S1412, the controller 139 can compare the device representative temperature $T_R$ with the reference temperature $T_n$ and the reference temperature $T_{n+1}$.

The Step S141 of extracting the target brightness corresponding to the device representative temperature includes a step S1413 of determining whether the device representative temperature $T_R$ is equal to the reference temperature $T_n$. When the device representative temperature $T_R$ is greater than or equal to the reference temperature $T_n$, the controller 139 determines whether or not the device representative temperature $T_R$ is equal to the reference temperature $T_n$.

Further, the step S141 of extracting the target brightness corresponding to the device representative temperature includes a step S1414 of extracting the target brightness using the interpolation method. When the device representative temperature $T_R$ is different from the reference temperature $T_n$ in this step S1414, the controller 139 can extract the device representative temperature $T_R$ using an interpolation method. The target brightness $BR_G$ by the interpolation method is as follows. Here, the interpolation method means linear interpolation.

$$BR_G = BR_n + \left(\frac{BR_{n+1} - BR_n}{T_{n+1} - T_n}\right) \times (T_R - T_n)$$

In the above equation, $BR_n$ means the n-th reference brightness and the $BR_{n+1}$ means the 'n+1'th reference brightness. $T_n$ can be the n-th reference temperature. $T_{n+1}$ means the 'n+1'th reference temperature. The reference temperature and the reference brightness can be referenced in FIGS. 7 and 8.

The step S141 of extracting the target brightness corresponding to the device representative temperature includes a step S1415 of setting the n-th reference brightness $BR_n$ corresponding to the n-th reference temperature $T_n$ to the target brightness $BR_G$. In this step S1415, when the device representative temperature $T_R$ is equal to the reference temperature $T_n$, the controller 139 can set the target brightness $BR_G$ to the n-th reference brightness $BR_n$.

The step S141 of extracting the target brightness corresponding to the device representative temperature includes a step S1416 of increasing the indicator. In this step S1416, the controller 139 can increase the indicator n by one. For example, if the indicator n is currently 12, the controller 139 can set the indicator n to 13 in this step S1416.

The step S141 of extracting the target brightness corresponding to the device representative temperature includes a step S1417 of determining whether the indicator is 20 or not. In this step S1417, the controller 139 can judge whether the indicator n is 20 or not. When the indicator n is 20, the controller 139 can set the target brightness $BR_G$ to the 20th reference brightness $BR_{20}$. When the indicator n is less than 20, the controller 139 can compare the device representative temperature $T_R$ with the n-th reference temperature $T_n$ and the 'n+1'-th reference temperature $T_{n+1}$.

Figure 12:
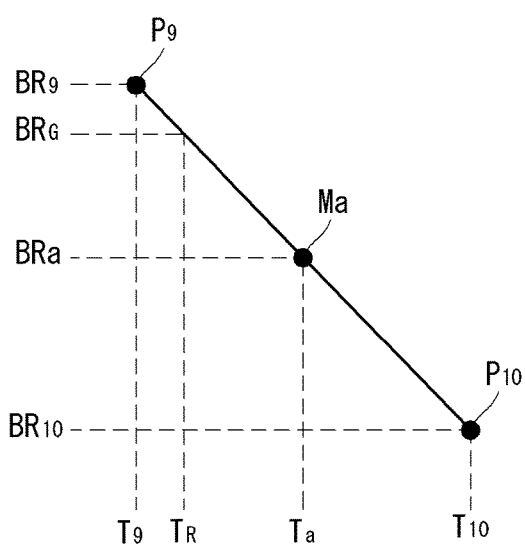
Figure 12:
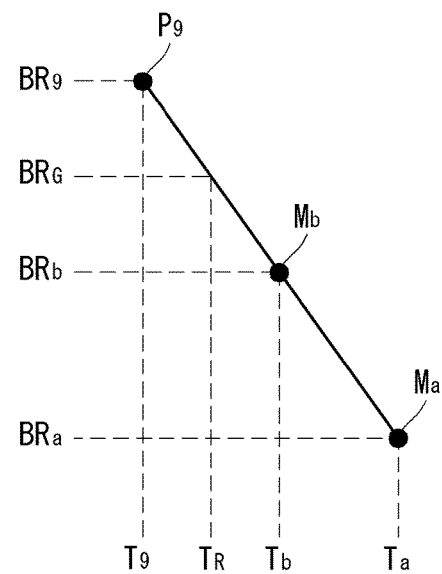
Figure 12:
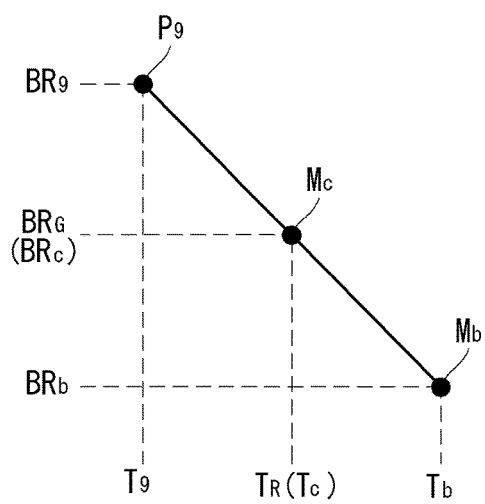

Referring to FIG. 12, the step S1414 of extracting the target brightness using the interpolation method shown in FIG. 11 can be illustrated with a drawing. The interpolation method shown in FIG. 11 may be based on an analytic solution, while the interpolation method shown in FIG. 12 may be based on a numerical method. The interpolation method shown in FIG. 12 can be based on the interpolation method shown in FIG. 11.

FIG. 12 can be explained together with FIGS. 8 and 11. For example, the device representative temperature $T_R$ may be between the ninth reference temperature $T_9$ and the tenth reference temperature $T_{10}$.

Referring to FIG. 12(a), the ninth combination $P_9$ may be a combination of the ninth reference temperature $T_9$ and the ninth reference luminance $BR_9$. The tenth combination $P_{10}$ may be a combination of the tenth reference temperature $T_{10}$ and the tenth reference brightness $BR_{10}$. If the device representative temperature $T_R$ is a temperature between the ninth reference temperature $T_9$ and the tenth reference temperature $T_{10}$, the target brightness $BR_G$ corresponding to the device representative temperature $T_R$ may be the brightness between the ninth reference brightness $BR_9$ and the tenth reference brightness $BR_{10}$.

The first intermediate combination $M_a$ can be set. The first intermediate combination $M_a$ may be a combination of the first intermediate temperature $T_a$ and the first intermediate brightness $BR_a$. The first intermediate temperature $T_a$ may be an average of the ninth reference temperature $T_9$ and the tenth reference temperature $T_{10}$. The first intermediate brightness $BR_a$ may be an average of the ninth reference brightness $BR_9$ and the tenth reference brightness $BR_{10}$. The device representative temperature $T_R$ can be compared with the first intermediate temperature $T_a$. Here, the average means an arithmetic average.

Referring to FIG. 12(b), if the device representative temperature $T_R$ is greater than the ninth reference temperature $T_9$ and less than the first intermediate temperature $T_a$, the second intermediate combination $M_b$ can be set. The second intermediate combination $M_b$ may be a combination of the second intermediate temperature $T_b$ and the second intermediate brightness $BR_b$. The second intermediate temperature $T_b$ may be an average of the ninth reference temperature $T_9$ and the first intermediate temperature $T_a$. The second intermediate brightness $BR_b$ may be an average of the ninth reference brightness $BR_9$ and the first intermediate brightness $BR_a$. The device representative temperature $T_R$ can be compared with the second intermediate temperature $T_b$.

Referring to FIG. 12(c), if the device representative temperature $T_R$ is greater than the ninth reference temperature $T_9$ and less than the second intermediate temperature $T_b$, a third intermediate combination $M_c$ may be set. The third intermediate combination $M_c$ may be a combination of the third intermediate temperature $T_c$ and the third intermediate brightness $BR_c$. The third intermediate temperature $T_c$ may be an average of the ninth reference temperature $T_9$ and the second intermediate temperature $T_b$. The third intermediate brightness $BR_c$ may be an average of the ninth reference brightness $BR_9$ and the second intermediate brightness $BR_b$.

The device representative temperature $T_R$ can be compared with the third intermediate temperature $T_c$. When the device representative temperature $T_R$ is the same as the third intermediate temperature $T_c$ or similar to the third intermediate temperature $T_c$ within the error range, the representative brightness $BR_G$ may be set to the third intermediate brightness $BR_c$.

Figure 13:
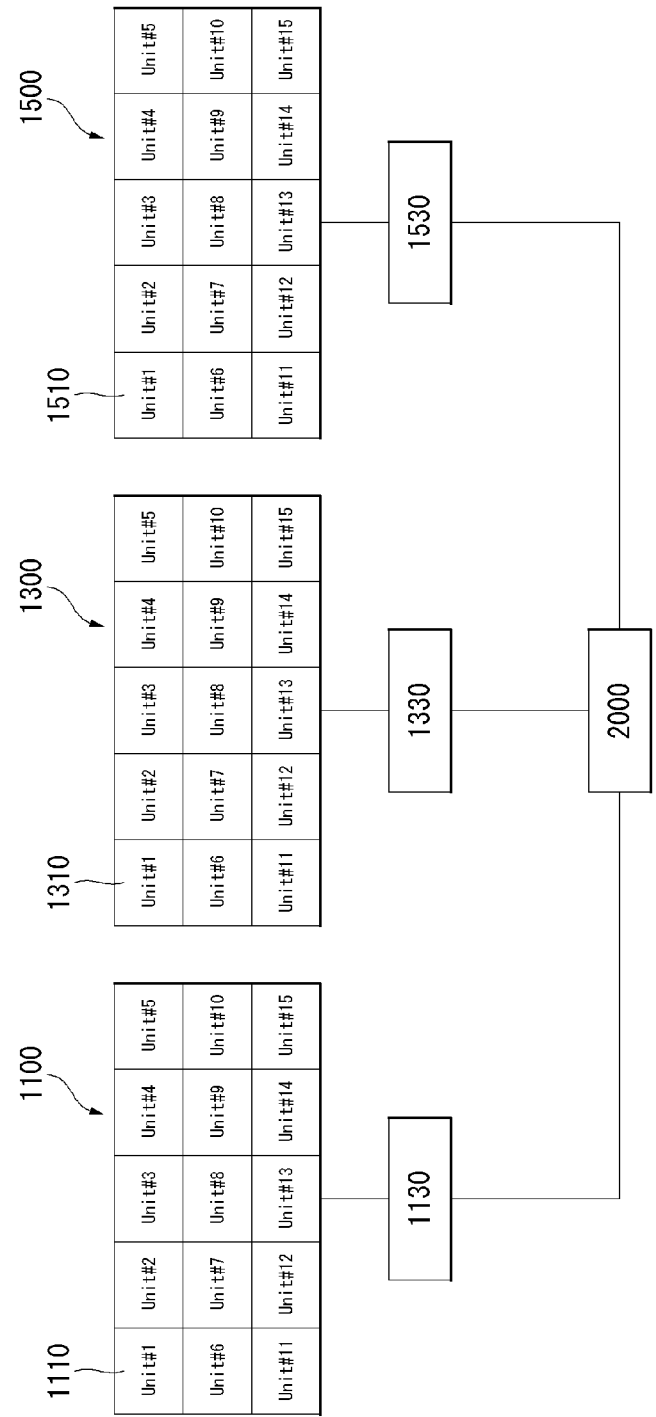

Referring to FIG. 13, a multi display device may include at least one or more display devices 1100, 1300, and 1500. For example, the multi display device may include a first display device 1100, a second display device 1300, and a third display device 1500.

The first display device 1100 may include a first group of display units 1110 and a first control unit 1130. The second display device 1300 may include a second group of display units 1310 and a second control unit 1330. The third display device 1500 may include a third group of display units 1510 and a third control unit 1530.

The first group of display units 1110 may include a plurality of display units 1110. For example, the first group of display units 1110 may include first to fifteenth display units 1110. 'Unit #n' of the display unit 1110 of the first group means an 'n-th display unit' of the first group. For example, 'Unit #7' displayed on the display unit 1110 of the first group means the seventh display unit 1110 of the first group. This manner is also applied in FIG. 14.

The second group of display units 1310 may include a plurality of display units 1310. For example, the second group of display units 1310 may include first to fifteenth display units 1310. 'Unit #n' of the display unit 1310 of the second group means an 'n-th display unit' of the second group. For example, 'Unit #9' displayed on the display unit 1310 of the second group means the ninth display unit 1310 of the second group. This manner is also applied in FIG. 14.

The third group of display units 1510 may include a plurality of display units 1510. For example, the third group of display units 1510 may include first to fifteenth display units 1510. 'Unit #n' of the display unit 1510 of the third group means an 'n-th display unit' of the third group. For example, 'Unit #11' displayed on the display unit 1510 of the third group means the eleventh display unit 1510 of the third group. This manner is also applied in FIG. 14.

The first control unit 1130 can be connected to the first group of display units 1110. The second control unit 1330 may be connected to the second group of display unit 1310. The third control unit 1530 may be connected to the third group of display unit 1510. The first to third control units 1130, 1330, and 1530 may be connected to the router 2000.

The router 2000 can automatically assign various TCP/IP protocol default settings including different IP addresses to the first control unit 1130 to the third control unit 1530. For example, the router 2000 may include a DHCP (dynamic host configuration protocol).

One of the first control unit 1130 to the third control unit 1530 may be set as a master and the rest may be set as a slave. For example, when the first control unit 1130 is set as a master, the second and third control units 1330 and 1530 may be set as slaves. The first to third control units 1130, 1330, and 1530 may share data via the router 2000. For example, the device representative temperature and the target brightness of the display unit 1110 of the first group set as the master may be transmitted to the second control unit 1330 and the third control unit 1530. The first to third display devices 1100, 1300, and 1500 can simultaneously lower the brightness according to the target brightness corresponding to the device representative temperature.

Figure 14:
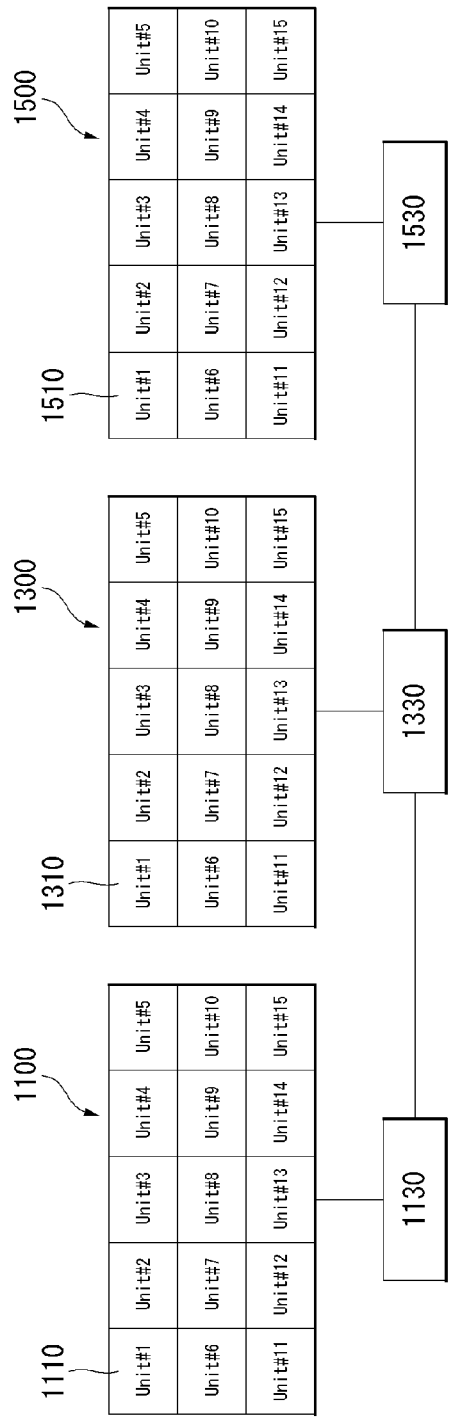

Referring to FIG. 14, the first to third control units 1130 to 1530 can be directly connected without going through the router 2000 (see FIG. 13). For example, the first control unit 1130 to the third control unit 1530 may be connected by a LAN Daisy Chain.

Figure 15:
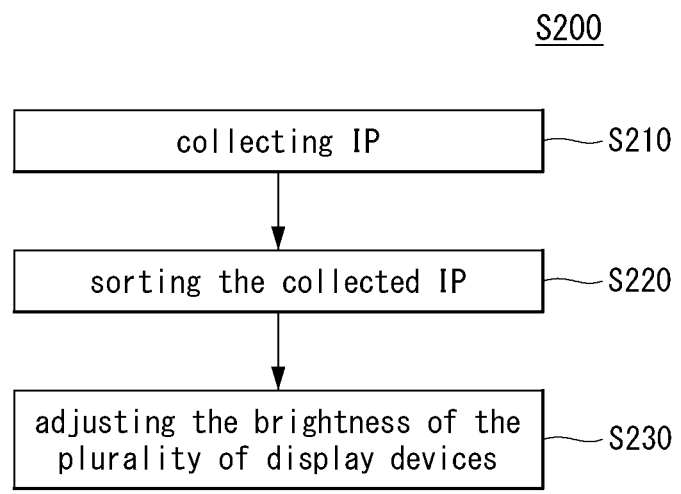

Referring to FIG. 15, a method S200 for controlling brightness of a multi display device includes a step S210 of collecting IP. The multi display device may include a display device set as a master and a display device set as a slave. A display device set as a master may be referred to as a 'master display device'. A display device set as a slave may be referred to as a 'slave display device'. In this step S210, the master display device can acquire the IP of the slave display device.

The master display device can request IP information from the slave display device. The master display device can obtain IP information from the slave display device. In this step S210, erroneous IP information may be transmitted to the master display device.

The multi display device can continuously collect IP information for a certain period. For example, the certain period may be 30 seconds or 60 seconds. The multi display device can organize the collected IP information sequentially.

The method S200 for controlling brightness of a multi display device includes a step S220 of sorting the collected IP. In this step S220, erroneous IP information can be removed.

The master display device can send a check signal to the slave display device. The slave display device which received the check signal can transmit the response signal corresponding to the check signal to the master display device. The master display device can compare the response signal with the check signal to determine the suitability of the IP information. The IP information having low suitability may be deleted.

The method S200 for controlling brightness of a multi display device includes a step S230 of adjusting the brightness of the plurality of display devices. In this step S230, the brightness of the plurality of display devices can be adjusted based on exchanging information between the master display device and the slave display device based on the collected IP.

Figure 16:
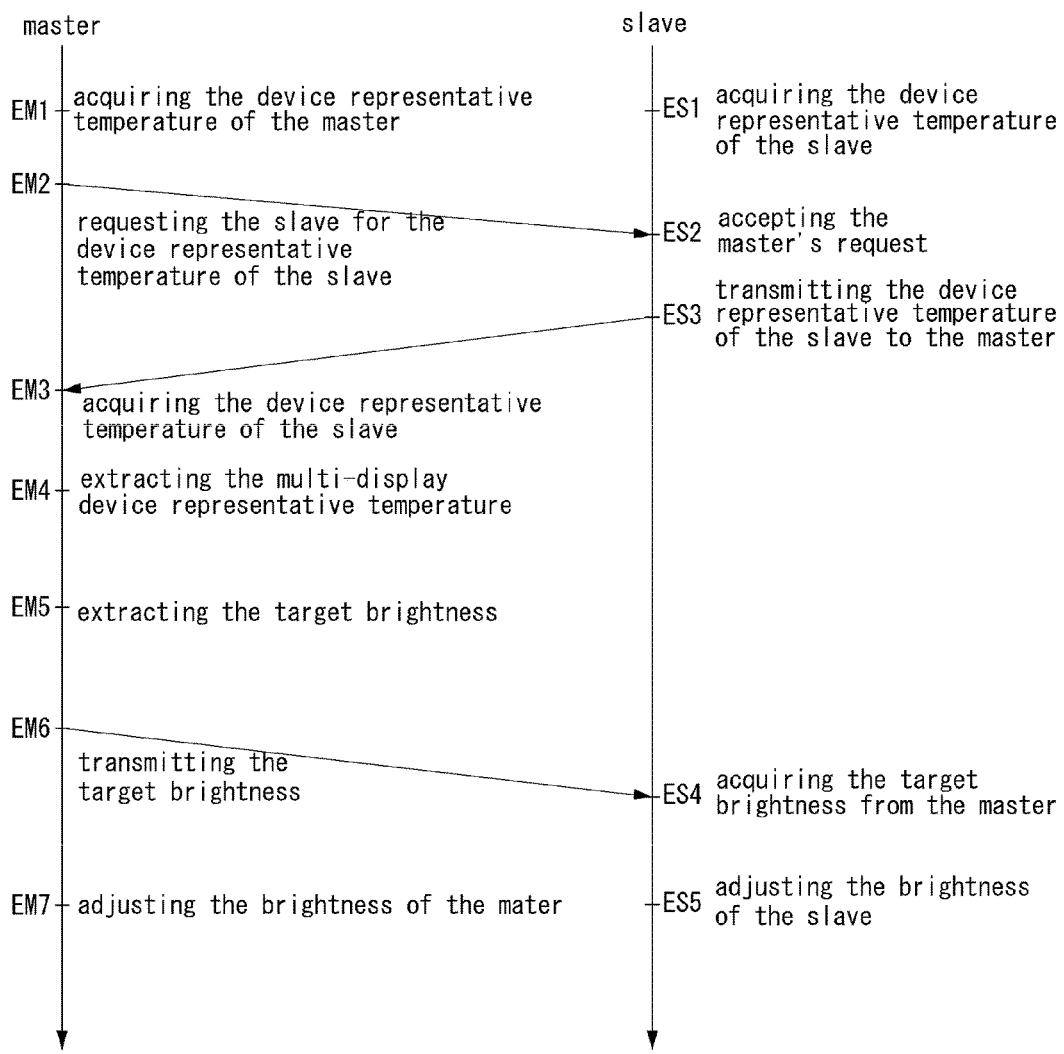

Referring to FIG. 16, the step S230 of adjusting the brightness of the plurality of display devices shown in FIG. 15 is displayed. In FIG. 16, the master display device may be referred to as a master. In FIG. 16, the slave display device can be referred to as a slave. In FIG. 16, an event generated in accordance with the passage of time is shown. FIG. 16 shows the step S230 within one period in which the brightness of a plurality of display devices is adjusted.

In FIG. 16, arrows may indicate the flow of time or passage of time. For example, the first to seventh events EM1 to EM7 of the master may happen sequentially. For example, the first to fifth events ES1 to ES5 of the slave may happen sequentially.

The first event EM1 of the master may be an event that the master acquires the device representative temperature of the master. The first event ES1 of the slave may be an event that the slave acquires the device representative temperature of the slave.

The second event EM2 of the master may be an event that the master requests the slave for the device representative temperature of the slave. The second event ES2 of the slave may be an event that the slave accepts the master's request. The third event ES3 of the slave may be an event that the slave transmits the device representative temperature of the slave to the master.

The third event EM3 of the master may be an event that the master acquires the device representative temperature of the slave. The fourth event EM4 of the master may be an event that the master extracts the multi display device representative temperature from the device representative temperature of the master and the device representative temperature of the slave. The multi display device representative temperature may refer to a temperature representing the multi display device. For example, the representative temperature of the multi display device means the highest temperature among the device representative temperature of the master and the device representative temperature of the slave.

The fifth event EM5 of the master may be an event that the master extracts the target brightness of the multi display device. The target brightness may correspond to the multi display device representative temperature of the multi display device.

The sixth event EM6 of the master may be an event that the master transmits the target brightness to the slave. The fourth event ES4 of the slave may be an event that the slave acquires the target brightness from the master.

The seventh event EM7 of the master may be an event that the master adjusts the brightness of the master based on the target brightness. The fifth event ES5 of the slave may be an event that the slave adjusts the brightness of the slave based on the target brightness.

The foregoing embodiments are merely examples and are not to be considered as limiting the present disclosure. The present teachings can be readily applied to other types of methods and apparatuses. The features, structures, methods, and other characteristics of the embodiments described herein may be combined in various ways to obtain additional and/or alternative embodiments.

Certain embodiments or other embodiments of the invention described above are not mutually exclusive or distinct from each other. Any or all elements of the embodiments of the invention described above may be combined or combined with each other in configuration or function.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A display device comprising:
a plurality of display units;
a plurality of unit temperature sensors respectively connected to the plurality of display units and configured to respectively sense temperatures of the plurality of display units; and
a control unit configured to:
set a highest temperature of the sensed temperatures of the plurality of display units as a device representative temperature, and
adjust a brightness of all of the plurality of display units in accordance with the device representative temperature,
wherein the control unit is further configured to:
adjust the brightness of all of the plurality of display units based on a temperature-brightness table,
wherein the temperature-brightness table includes combinations of a plurality of reference temperatures and a plurality of reference brightnesses,
wherein the plurality of reference temperatures are divided into a first temperature range and a second temperature range, and
wherein the reference brightnesses of the first temperature range are set to constant and the reference brightnesses of the second temperature range are gradually decreased, as the temperature belonging to the second temperature range increases.

2. The display device of claim 1, wherein the control unit is further configured to:
extract a target brightness corresponding to the device representative temperature from the temperature-brightness table, and
adjust the brightness of each of the plurality of display units in accordance with the target brightness.

3. The display device of claim 2, wherein the control unit is further configured to:
set a brightness between a first reference brightness corresponding to a first reference temperature and a second reference brightness corresponding to a second reference temperature as the target brightness, when the device representative temperature is between the first reference temperature and the second reference temperature, and
wherein the first and second temperatures are neighboring reference temperatures among the plurality of reference temperatures.

4. A multi display device comprising:
a first display device including:
a first group of display units;

a first group of unit temperature sensors respectively connected to the first group of display units and configured to sense temperatures of the first group of display units; and a first control unit configured to:

extract a first representative temperature from the temperatures of the first group of display units; and adjust a brightness of all of the first group of display units in accordance with the first representative temperature; and a second display device including:

a second group of display units;

a second group of unit temperature sensors respectively connected to the second group of display units and configured to sense temperatures of the second group of display units; and a second control unit configured to:

extract a second representative temperature from the temperatures of the second group of display units; and adjust a brightness of all of the second group of display units in accordance with the second representative temperature, wherein the first control unit is connected to the second control unit, wherein the first and second control units are further configured to:

set a brightness corresponding to a higher temperature among the first and second representative temperature as a target brightness, and adjust the brightness of the first and second groups of display units in accordance with the target brightness, wherein the first and second control units are further configured to adjust the brightness of each of the first and second groups of display units based on a temperature-brightness table, wherein the temperature-brightness table includes combinations of a plurality of reference temperatures and a plurality of reference brightnesses, wherein the plurality of reference temperatures are divided into a first temperature range and a second temperature range, and wherein the reference brightnesses of the first temperature range are set to constant and the reference brightnesses of the second temperature range are gradually decreased, as the temperature belonging to the second temperature range increases.

5. The multi display device of claim 4, wherein the first control unit is further configured to:

request the second control unit for the second representative temperature, and extract a device representative temperature from the first and second representative temperatures, and wherein the first and second control units are further configured to adjust the brightness of each of the first and second groups of display units in accordance with the device representative temperature.

6. The multi display device of claim 4, wherein the first control unit is further configured to extract a target brightness corresponding to the device representative temperature from the temperature-brightness table, and wherein the first and second control units are further configured to adjust the brightness of each of the first and second groups of display units in accordance with the target brightness.

7. The multi display device of claim 6, wherein the first control unit is further configured to set a brightness between a first reference brightness corresponding to a first reference temperature and a second reference brightness corresponding to a second reference temperature as the target brightness, when the device representative temperature is between the first reference temperature and the second reference temperature, and wherein the first and second temperatures are neighboring reference temperatures among the plurality of reference temperatures.

8. The multi display device of claim 7, wherein the first control unit is further configured to extract the target brightness from the first and second reference brightnesses by using an interpolation method.

9. A method of controlling a display device including a plurality of display units, the method comprising sensing, via a plurality of unit temperature sensors respectively connected to the plurality of display units, temperatures of the plurality of display units;

setting, via a control unit, a highest temperature of the sensed temperatures of the plurality of display units as a device representative temperature; and adjusting, via the control unit, a brightness of all of the plurality of display units in accordance with the device representative temperature, wherein the adjusting the brightness adjusts the brightness of all of the plurality of display units based on a temperature-brightness table, wherein the temperature-brightness table includes combinations of a plurality of reference temperatures and a plurality of reference brightnesses, wherein the plurality of reference temperatures are divided into a first temperature range and a second temperature range, and wherein the reference brightnesses of the first temperature range are set to constant and the reference brightnesses of the second temperature range are gradually decreased, as the temperature belonging to the second temperature range increases.

10. The method of claim 9, further comprising:

extracting, via the control unit, a target brightness corresponding to the device representative temperature from the temperature-brightness table; and adjusting, via the control unit, the brightness of each of the plurality of display units in accordance with the target brightness.

* * * * *